United States Patent [19]

Kikuchi

[11] Patent Number: 5,447,338
[45] Date of Patent: Sep. 5, 1995

[54] ESCUTCHEON FOR USE WITH SPRINKLER HEAD
[75] Inventor: Teturo Kikuchi, Iwate, Japan
[73] Assignee: Senju Sprinkler Company Limited, Tokyo, Japan
[21] Appl. No.: 231,317
[22] Filed: Apr. 22, 1994
[30] Foreign Application Priority Data Apr. 23, 1993 [JP] Japan .................. 5-026548 U

[51] Int. Cl.6 .............................................. F16L 5/00
[52] U.S. Cl. ......................... 285/46; 169/37; 137/359
[58] Field of Search ................. 285/46; 169/37; 137/359; 248/56; 292/357

[56] References Cited

U.S. PATENT DOCUMENTS

| 2,283,674 | 5/1942 | Geyer | 292/357 |
| 3,615,108 | 3/1969 | Toth | 285/46 |
| 3,823,964 | 7/1974 | Politz | 285/46 |
| 4,672,994 | 6/1987 | Ko | 137/359 |
| 4,926,946 | 5/1990 | Polan | 169/37 |
| 5,083,616 | 1/1992 | Polan | 169/37 |
| 5,152,344 | 10/1992 | Fischer et al. | 169/37 |
| 5,184,683 | 2/1993 | Takamasa | 169/37 |
| 5,243,153 | 9/1993 | Holwerda | 248/56 |

Primary Examiner—Eric K. Nicholson
Attorney, Agent, or Firm—Tarolli, Sundheim & Covell

[57] ABSTRACT

An escutcheon including a cylindrical portion and a flange disposed below the cylindrical portion. The cylindrical portion and the flange are integrally formed from a heat resisting material. The cylindrical portion is divided into a plurality of tongue portions by a plurality of silts. Each of the slits is formed, in its bottom portion, with a slot having a width larger than that of the slit. Each of the tongue portions is formed with a plurality of protrusions.

3 Claims, 2 Drawing Sheets

ESCUTCHEON FOR USE WITH SPRINKLER HEAD

FIELD OF THE INVENTION

This invention relates to an escutcheon or a sealing plate for attachment to a fire extinguishing sprinkler head.

BACKGROUND OF THE INVENTION

Sprinkler heads are attached to down pipes downwardly which extend from horizontal pipes within a ceiling and protrude from a hole formed in a ceiling plate.

Upon installation of the sprinkler heads in the ceiling, the sprinkler heads are fitted with a protective cap having a sharp end and are attached to respective rising pipes connected to a horizontal pipe disposed within the ceiling. The ceiling plate is then brought into an appropriate position for attachment and moved upwardly to urge it against the protective caps. Thus, the ceiling plate is provided with an indicating mark by the sharp end of a respective protective cap. The sprinkler heads protrude from the ceiling plate at thus marked positions after installation of the ceiling plate in the ceiling after removal of the ceiling plate formed with the indicating mark from the ceiling, it is provided with a plurality of holes around the indicating marking by means of a drill. Each hole has a diameter slightly larger than that of the sprinkler head. The sprinkler heads are then inserted into the holes to secure the ceiling plate at a predetermined position to the ceiling (see Japanese Patent Publication No. 58-16906).

When the ceiling plate formed with the holes is attached in the above manner, an annular gap is formed around the sprinkler head protruding from the hole in the ceiling. Such a gap is formed since the hole formed in the ceiling plate has a diameter larger than that of the sprinkler head. There is a disadvantage in which pipings and electric wirings etc., disposed within the ceiling are visible through the gaps. Also, since the the holes are visible, the ceiling plate is not preferable from an aesthetic point of view. The above gaps also permit dust or dirt within the ceiling to fall into a room. In order to conceal the above gaps, a sprinkler head is conventionally fitted with an escutcheon or a sealing plate.

The escutcheon includes a cylindrical portion and a dish-like flange disposed below the cylindrical portion, the cylindrical portion and the flange being integrally formed. The cylindrical portion is fitted around the body of the sprinkler head, so that the flange conceals the gap in the ceiling.

A conventional escutcheon is formed from a soft resin material in view of its low cost. Such a soft resin material also permits easy attachment of the escutcheon to the sprinkler head. The escutcheon is formed to have a plurality of protrusions in the inner surface of the cylindrical portion. The protrusions are engaged with grooves formed in the sprinkler head when the escutcheon is attached to the sprinkler head, so as to avoid dislodgement of the escutcheon from the sprinkler head (refer to Japanese Utility Model Public Disclosure Nos. 55-162636 and 59-114152). Japanese Utility Model Publication No. 58-2359 discloses an escutcheon including a cylindrical portion which is divided into plural portions by means of a plurality of slits. The plural portions resiliently contribute to securement of the escutcheon to the sprinkler head.

The above escutcheon having simple protrusions or slits may be easily attached to the sprinkler head. Sufficient inter-engagement may be obtained between the escutcheon and the sprinkler head, so that the escutcheon is hardly dislodged from the sprinkler head. This is because a conventional escutcheon is formed from a soft synthetic resin such as polyethylene or polypropylene, so that, upon attachment of the escutcheon to the sprinkler head, the protrusions formed in the cylindrical portion of the escutcheon are deformed to enter the respective grooves in the sprinkler head. With an escutcheon having a cylindrical portion formed with a plurality of slits, the cylindrical portion may be easily deformed upon attachment thereof to the sprinkler head and attached to the sprinkler head by means of its own resiliency.

It is noted, however, that a conventional escutcheon formed from a soft synthetic resin may cause an accident when a fire occurs. When an escutcheon formed from a soft synthetic resin, typically having a low heat resisting property, is directly subjected to a flame during a fire, the escutcheon melts prior to supply of water from a sprinkler head and is adhered to a heat sensitive, breakable portion of the sprinkler head thereby impeding proper actuation thereof. The melted escutcheon may also extend downwardly so as to block water from the sprinkler head, so that a proper spray is not obtained.

The inventor has found that the above problem in the prior art escutcheon formed from a soft synthetic resin may be obviated when an escutcheon is formed from a heat resisting material such as metal or heat resisting synthetic resin which does not melt when subject to strong heat. It was found, however, that an attachment mechanism employed in conventional escutcheon formed from a soft synthetic resin material could not be used when the escutcheon is formed from a heat resisting synthetic resin. Since metal or a heat resisting synthetic resin is very hard, protrusions formed in a cylindrical portion of an escutcheon formed from such hard material could not be inter-engaged with the groove in the sprinkler head. Even when an escutcheon of a heat resisting material is divided into a plurality of tongue portions by means of a plurality of slits, such tongue portions having an arcuate cross-section result in an increase in mechanical strength, so that the escutcheon can not be easily deformed so as to be attached to the sprinkler head. If the tongue portions are forcibly deformed, they tend to be broken or deformed. This causes subsequent dislodgement of the escutcheon from the sprinkler.

When multiple slits are formed in the cylindrical portion of the escutcheon formed from a heat resisting material so as to reduce an arcuate extension of each of the tongue portions, it is possible for the tongue portions to be bent easily and to be fitted over the sprinkler head under their own resiliency. It is noted, however, that an escutcheon having tongue portions which are too narrow has insufficient resilient force so that it may be dislodged from the sprinkler head over time.

Accordingly, the present invention is directed to a provision of an escutcheon including a cylindrical portion formed from metal or heat resisting synthetic resin. The cylindrical portion, when formed with a plurality of slits, has an appropriate resiliency for permitting the escutcheon to be fitted around a sprinkler head. The escutcheon may be easily attached to the sprinkler head.

SUMMARY OF THE INVENTION

The inventor has completed the invention by studying what measure should be employed to provide a plurality of tongue portions formed by providing a plurality of slits in a cylindrical portion of an escutcheon desired strength and resiliency.

In accordance with the invention, an escutcheon for use with a sprinkler head is provided which comprises a cylindrical portion and a dish-like flange disposed below the cylindrical portion, the cylindrical portion and the dish-like flange being entirely and integrally formed from a heat resisting material. The cylindrical portion is divided into a plurality of tongue portions by means of a plurality of slits extending along the axial direction of the cylindrical portion. Each of the tongue portions is formed with a plurality of protrusions. Each of the slits is formed, in the bottom portion thereof, with a notch having a width greater than that of the slit.

The protrusions formed in the tongue portions of the escutcheon according to the invention may take the form of a discontinuous line, or continuous line. It is noted, however, that easy adjustment of attachment position of the escutcheon relative to the sprinkler head and secure fitting of the escutcheon over the sprinkler head may be performed, when the protrusions are formed in a linear configuration and the protrusions in one tongue portion are offset from those in adjacent tongue portions.

The heat resisting material to be used in the invention may include, for example, metals such as iron, copper, aluminium, and alloys thereof, and heat resisting synthetic resins such as polyphenylene stylene and Nylon 66.

BRIEF DESCRIPTION OF THE DRAWINGS

The invention will be explained in detail below with reference to the attached drawing in which.

DETAILED DESCRIPTION OF THE PREFERRED EMBODIMENTS

Figure 1:
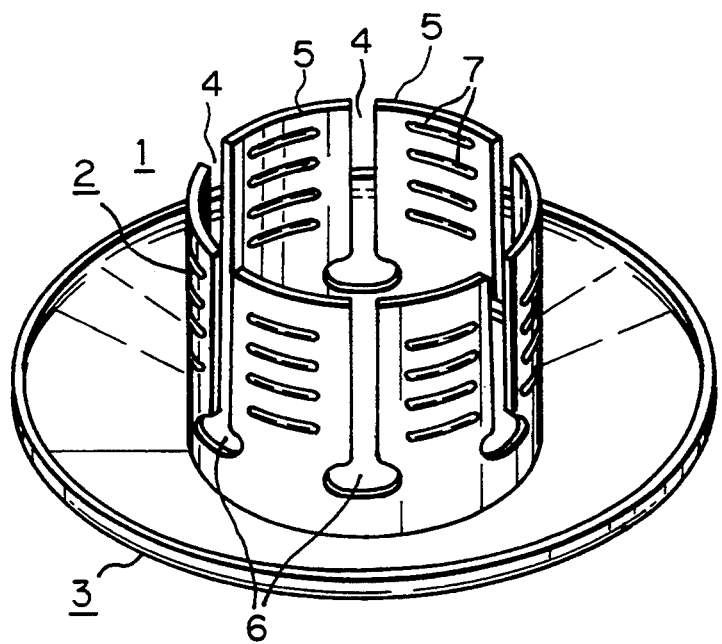
FIG. 1 is a perspective view of an escutcheon according to the invention.
Figure 2:
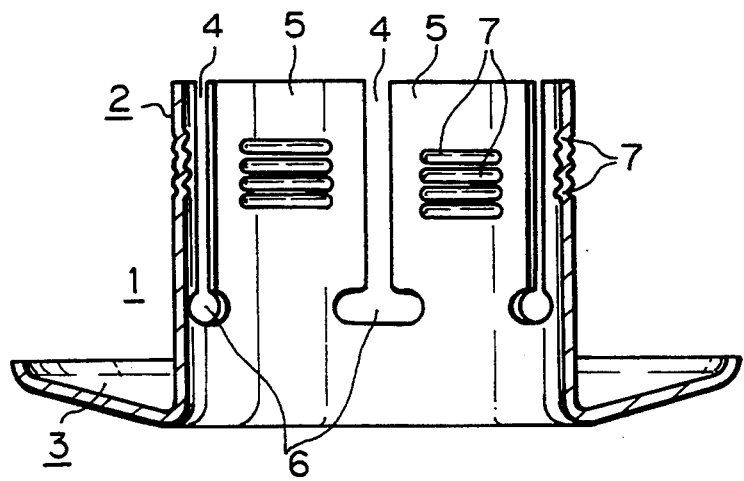
FIG. 2 is a front elevational view, in section, of the escutcheon according to the invention.

An escutcheon 1 includes a cylindrical portion 2 and a dish-like flange 3 connected to the bottom of the cylindrical portion 2. The escutcheon and flange are integrally formed from a heat resisting material. The cylindrical portion 2 is divided into a plurality of tongue portions 5 by means of a plurality of slits 4 extending along the axial direction of the cylindrical portion 2.

Each of the slits 4 is formed with a slot 6 having a width greater than that of the slit. Preferably, each slot 6 has rounded, opposite ends for safety purposes. If the opposite ends of the slot are formed into an angular configuration, cracking or folding would occur in the angular portion when the tongue portions are slightly deformed.

Figure 4:
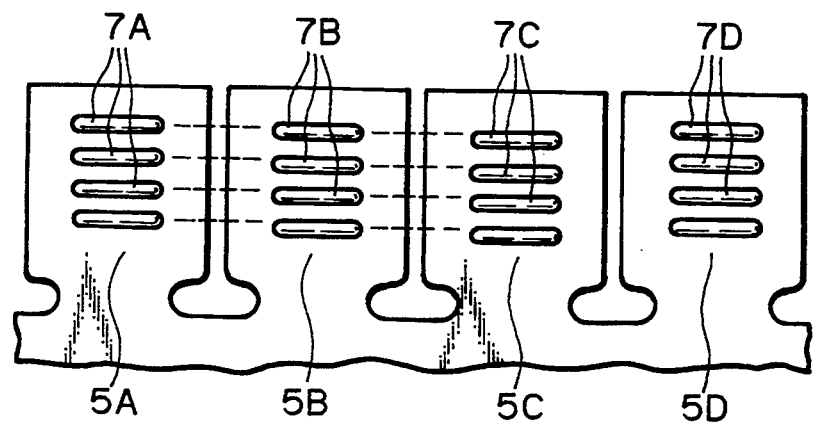
FIG. 4 is a development view of the escutcheon according to the invention.

Each of the tongue portions 5 is formed with a plurality of protrusions 7 which protrude inwardly. The protrusions 7 extend transversely to the axial direction of the cylindrical portion. The protrusions 7 in one tongue portion are slightly offset from those in the adjacent tongue portions. The position of the protrusions will be explained with reference to FIG. 4. The center lines (single dotted line) of the protrusions 7A in the tongue portion 5A are consistent with the upper edges of the protrusions 7B, respectively, in the tongue portion 5B adjacent to the tongue portion 5A. Likewise, the center lines of the protrusions 7B in the tongue portion 5B are consistent with the upper edges of the protrusions 7C in the tongue portion 5C, respectively. When the cylindrical portion is divided into 6 tongue portions by means of 6 slits, the opposed tongue portions, for example, tongue portions 5A and 5D, preferably have protrusions formed in the same position. With the protrusions of the opposed tongue portions being formed in the same position, at least the opposed two tongue portions can be fitted over a sprinkler head in the same manner when the escutcheon is attached to the sprinkler head. Thus, the escutcheon may be attached to the sprinkler head in parallel relationship therewith.

Figure 3:
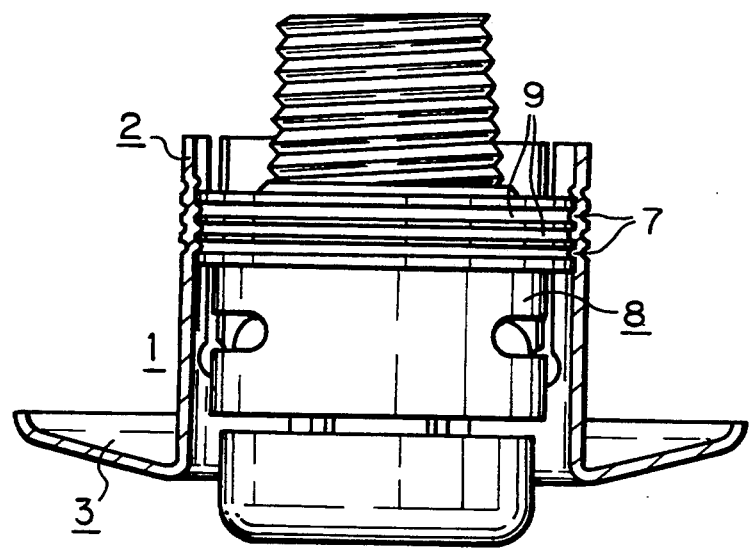
FIG. 3 is a front elevational view, in section, of the escutcheon attached to a sprinkler head.

The sprinkler head 8 to which the escutcheon of the invention is attached includes a body portion. The body portion is formed, in the upper portion thereof, with a plurality of grooves 9, as shown in FIG. 3. It is to be noted that the distance between the ridges of the grooves, i.e., the pitch of the grooves, is the same as the distance between the valleys of the escutcheon, i.e., the pitch of the escutcheon.

The escutcheon according to the invention, when attached to the sprinkler head, will be explained below.

The escutcheon in its entirety is formed from an iron material having a thickness of 0.5 mm. The cylindrical portion is formed with 6 (six) silts having a width of 2 mm. The slits are equidistantly disposed around the cylindrical portion. Each slit has, in the lower portion thereof, a notch having opposite, semicircular ends. The height of the slit is 3 mm. The distance between the opposite ends of the slit is 8 mm. Each tongue portion is formed with 4 (four) linear protrusions which are protruded in a radially inward direction of the cylindrical portion. The height of each of the protrusion is 0.6 mm. The pitch or distance between the protrusions is 3 mm. The protrusions in one tongue portion are so formed that their center-lines are consistent with the upper edges of the protrusions in the tongue portions adjacent to one tongue portion.

The escutcheon explained above was attached to a sprinkler head having an outer diameter of 35 mm and formed with grooves having a pitch the same as that of the pitch of the protrusions of the escutcheon. The attachment work was easily performed. The escutcheon did not tend to be dislodged from the sprinkler head when small amount of downward force was applied to the escutcheon after installation. The escutcheon was removed from the sprinkler head and again attached to the sprinkler head. In this case, the escutcheon was firmly attached to the sprinkler head in the same manner as in the initial attachment.

An escutcheon having a construction the same as that of the above escutcheon, with the exception that the slits are not formed with a slot, was attached to a sprinkler head. Such attachment work could not be performed smoothly and required a substantial amount of force. The escutcheon, having been attached to the sprinkler head, was pulled down with a small amount of force. The result was that the escutcheon was easily detached from the sprinkler head. Inspection of the detached escutcheon showed that the tongue portions were folded at their midway point and thus lacked resiliency.

As explained above, the escutcheon according to the invention is formed in its entirety from a heat resisting material. Thus, it does not tend to melt during a fire, and therefore does not interfere with the actuation of the sprinkler head. Although the escutcheon is formed from a hard material, the tongue portions possess an appropriate amount of resiliency. Thus, the escutcheon may be easily attached to the sprinkler head. The escutcheon, after attachment, may reliably be held on the sprinkler head for an extended period of time due to its resiliency. It is possible for the escutcheon to be attached to the sprinkler head in parallel therewith, when the protrusions in one tongue portion are slightly offset from those in adjacent tongue portions.

What is claimed is:

1. An escutcheon for use in a sprinkler head comprising:

a cylindrical portion having a bottom portion;
   a disk-like flange disposed at the bottom portion of said cylindrical portion;
   said cylindrical portion and said flange being integrally formed from a heat resisting material;
   said cylindrical portion being divided into a plurality of spaced tongue portions formed by a plurality of slits which are circumferentially spaced of said cylindrical portion and which extend along an axis of said cylindrical portion; and
   a plurality of protrusions formed on each of said tongue portions;
   said protrusions being engageable with a plurality of grooves provided on a body portion on which said escutcheon is mounted;
   said protrusions in each of said tongue portions being of elongated linear configuration extending transversely to said axis of said cylindrical portion;
   said protrusions in one tongue portion being offset in the axial direction of said cylindrical portion from those in adjacent tongue portions.

2. An escutcheon as set forth in claim 1, wherein said each of said slits has a notch provided in the bottom portion of each of said slits and said notch having a width larger than that of the slit.

3. An escutcheon as set forth in claim 1, wherein said heat resisting material is a metal or heat resisting resin.

* * * * *